April 24, 1956   J. A. HARDMAN   2,742,753
POWER TRANSMISSION MEANS FOR RECIPROCATION CUTTING ASSEMBLY
Filed Jan. 28, 1953   2 Sheets-Sheet 1

INVENTOR.
James A. Hardman
BY Harold T. Stowell

ATTORNEY

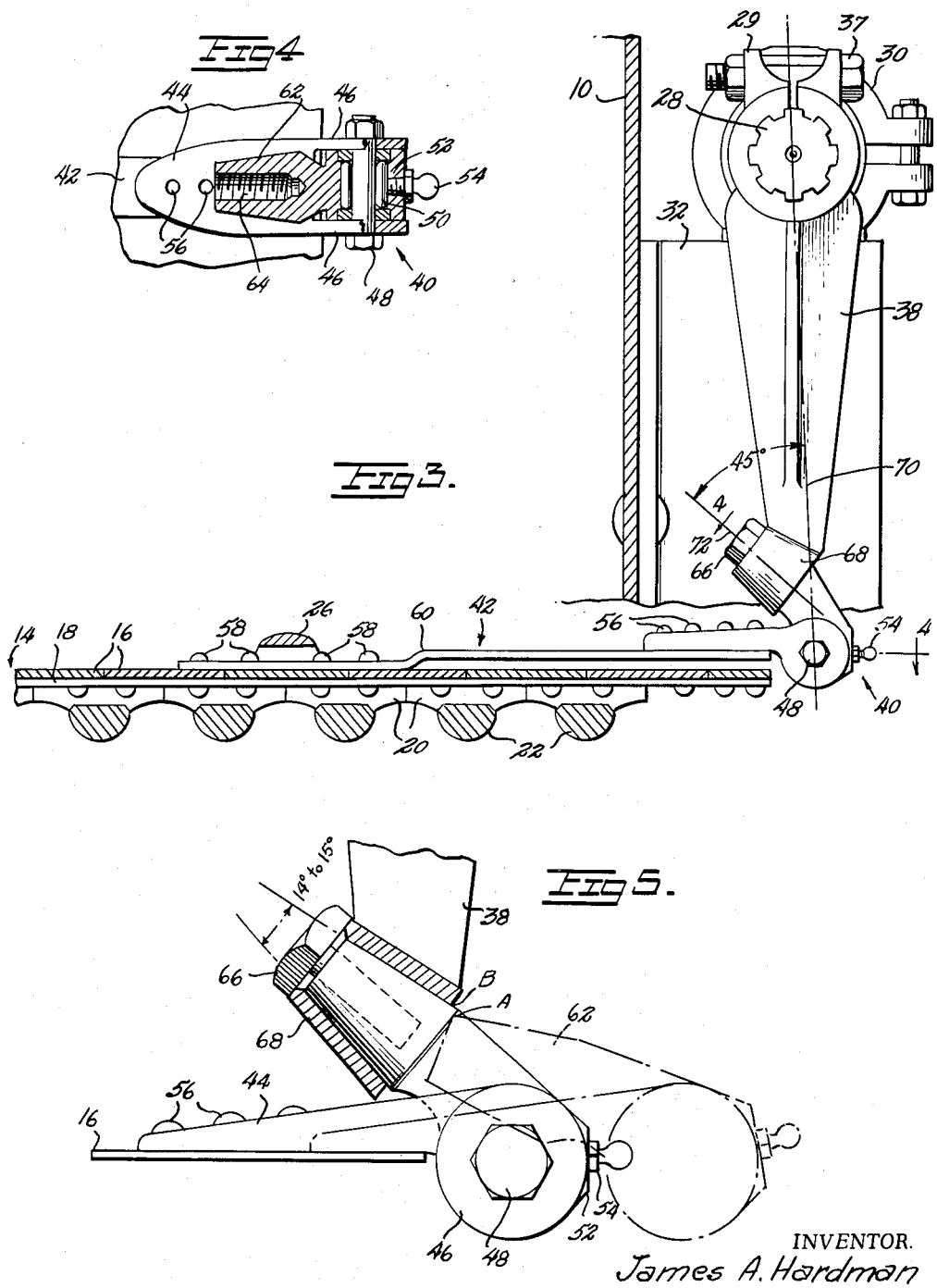

United States Patent Office 2,742,753
Patented Apr. 24, 1956

2,742,753

POWER TRANSMISSION MEANS FOR RECIPRO-
CATION CUTTING ASSEMBLY

James Abraham Hardman, Logan, Utah, assignor to Utah Scientific Research Foundation, Logan, Utah, a corporation of Utah Application January 28, 1953, Serial No. 333,768

3 Claims. (Cl. 56—296)

This invention relates to a drive connection between reciprocating devices, such as knives, saws, needles, precision implements, and the like, and an oscillatory drive mechanism.

It is an object of the invention to provide such a device that will minimize wear and vibration of reciprocatory members and which will provide for positive actuation thereof.

A further object is to provide such a device that will minimize undesirable force couples and lost motion between a reciprocating member and its oscillatory drive mechanism, thereby providing substantially trouble-free operation without need for frequent mechanical services and repairs.

Other objects are to provide a drive connection between reciprocating devices and an oscillatory drive mechanism which affords rapid and simple removal and reinstallation of the reciprocating device from its oscillatory drive mechanism, and to enable such removal and reinstallation to be accomplished without the exercise of mechanical skill and without the need of careful adjustments.

The invention is particularly applicable to the drive connection between the reciprocatory shearing knife, or sickle, of agricultural mowers, and the sickle drive mechanism and the invention will be more fully disclosed as applied to such cutting mechanisms.

The knife drive assembly for agricultural mowers customarily employs a pitman arrangement of one type or another, wherein the connection with the knife is made by means of a ball and socket joint disposed well above the cutting level of the knife. The ball of such joint is ordinarily rigidly attached to the knife by a relatively heavy, forged steel arm. The unitary combination of ball and arm is widely known as a "knife head." Such knife head is ruggedly designed to resist the considerable stresses and strains imposed upon the knife and its mounting during use of the machine.

This conventional pitman arrangement is responsible for much of the wear and undesirable vibration which has heretofore been regarded as normal for agricultural equipment of this nature, and, in addition, is responsible for many operational difficulties encountered in the field. Heavy guide or wear plates are necessary to keep the knife in line during its reciprocation, and the frictional resistance between the knife and the heavy wear plate, together with the heavy character of the knife head, impose an undue strain on the knife drive mechanism. As a consequence, all parts must be made structurally heavy, and, even then, must be replaced frequently.

The improved drive connection of the invention overcomes these difficulties, and relatively smooth operation is achieved with very little wear and practically no breakage of component parts. Furthermore, various parts of the sickle bar assembly may be considerably lightened in weight. In addition, the improved drive connection permits rapid removal of the knife from the cutter bar assembly, for sharpening or for replacement of blade sections, and enables the knife to be rapidly and easily reinstalled following the sharpening or replacement operation.

The aforementioned objects and advantages of the invention are therefore provided in a mowing machine having a sickle bar assembly including an elongated reciprocating knife and an oscillatory power transmitting member which generally comprises means connecting the oscillatory power transmitting member to the knife, the connecting means including a spring adapted for flexure in a plane parallel to the plane of oscillation of the power transmitting member, means securing one end of the spring to the knife, and an articulative joint connecting the other end of the spring to the power transmitting member; and by a reciprocatory motion imparting device which generally comprises a power transmitting member mounted for oscillatory motion, means connecting the power transmitting member to a device to be reciprocated, the connecting means including a leaf spring adapted for flexure in a plane parallel to the plane of oscillation of the power transmitting member having one of its ends secured to the device to be reciprocated, and means pivotally connecting the other end of the leaf spring to the power transmitting member substantially within the plane of the device to be reciprocated.

Additional objects and advantages of the invention will become apparent from the following detailed description of a specific embodiment of the invention with reference to the accompanying drawings, in which:

Fig. 3 is a view on line 3—3 of Fig. 2 showing the cutter bar in vertical section and the cutter knife drive in front elevation;

Fig. 4 is an enlarged sectional view along line 4—4 of Fig. 3 with parts omitted; and Fig. 5 is an enlarged elevational view, with parts broken away and shown in section, of the power transmission and coupling means, the broken line showing of the coupling being disconnected from said transmission means.

With reference to the drawings the improved drive connection is shown in its application to the crop-cutting assembly of a typical agricultural combine.

Figure 1:
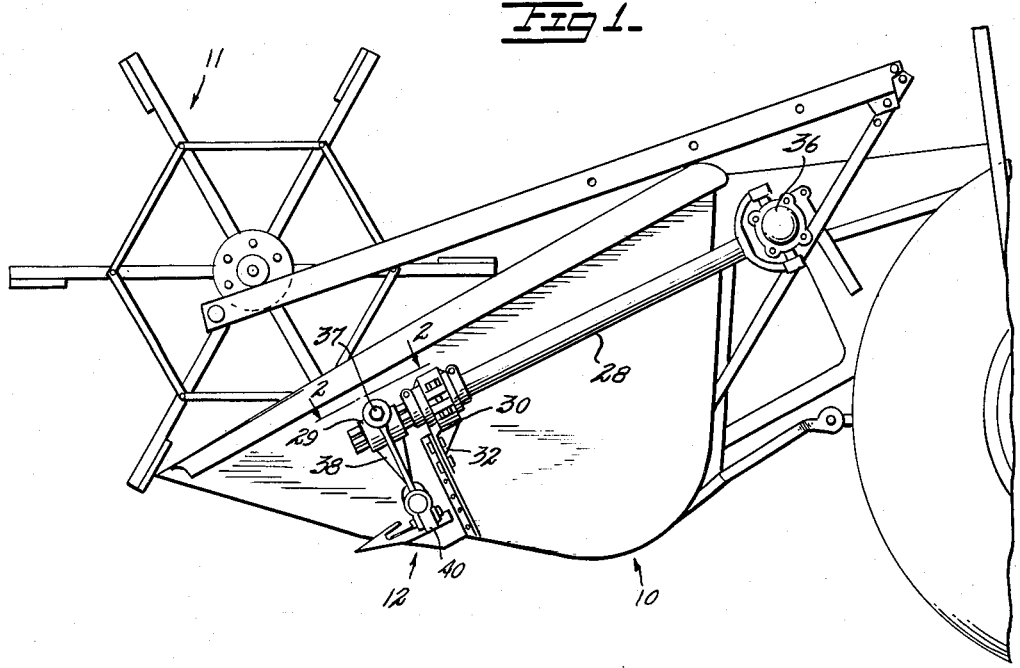
Fig. 1 is a side elevational view of the forward end of a typical agricultural combine embodying the drive connection of the invention.
Figure 2:
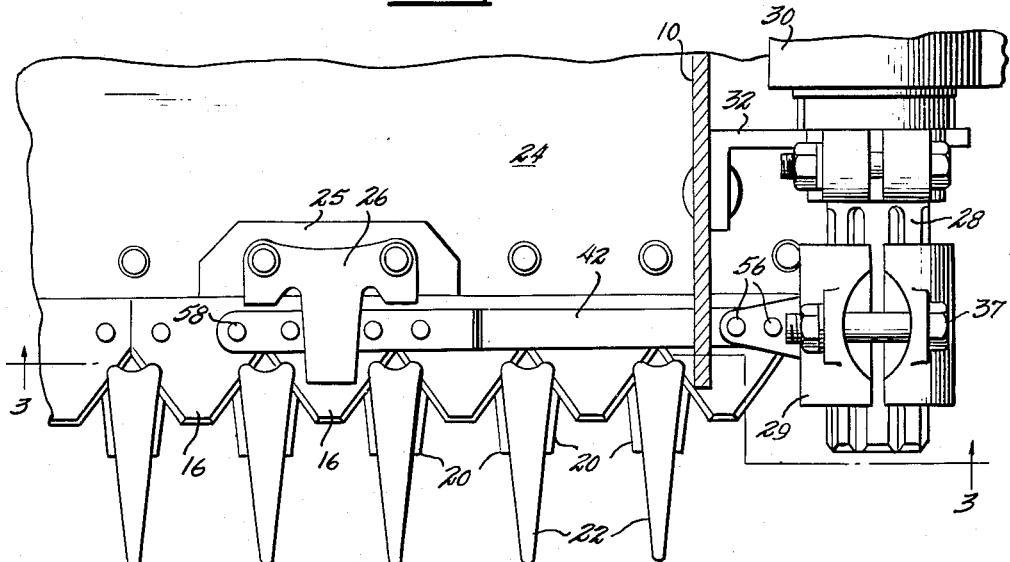
Fig. 2 is an enlarged fragmentary section on line 2—2 of Fig. 1.

An agricultural combine employs a so-called platform 10, Fig. 1, in connection with the cutting of the crop and the feeding thereof to the threshing mechanism located rearwardly of the platform. A power-driven reel 11 pushes the standing stalks into the line of shearing action of a reciprocatory sickle bar assembly 12. As more clearly shown in Figs. 2 and 3, the sickle bar assembly generally comprises an elongated reciprocating knife or sickle 14, having a series of forwardly tapered shear blades 16, secured in side-by-side relationship to a foundation bar 18. The shear blades co-act with complementary non-reciprocaing ledger plates 20. The ledger plates are secured to respective U-shaped guard members 22, which project forwardly of the machine and are rigidly fastened to the forward edge of the sickle bar platform 24. Cutting is effected by the reciprocative movement of the sickle 14 relative to the ledger plates 20 and within slideways defined by specially provided wear plates 25 and guide members 26.

The knife drive mechanism comprises an oscillating drive shaft 28, journalled within a bearing 30, which is mounted at the upper end of a bracket 32. The bracket 32 is secured to a side wall of the platform 10.

The oscillating shaft 28 is driven by a conventional drive arrangement 36, which will not be here described in detail.

A power transmitting member 38 is securely affixed to the projecting splined end of the shaft 28 by split clamp 29 and tangent screw 37, which affords adjustment of the position of the power transmitting member longitudinally of the shaft 28.

The knife drive connection of the invention joins the knife 14 to the oscillatory power transmitting member 38.

In general the drive connection comprises an articulative joint generally designated 40 and a blade or leaf spring 42 interposed between the articulative joint and the knife.

In the form of the invention shown in the drawings, the articulative joint 40 comprises a wrist type pivotal coupling having its pivotal axis extending transversely of the longitudinal extension of the knife and transversely of the plane of oscillation of the power transmitting member 38.

One member of the pivotal coupling 40 is made up of an elongated tab portion 44 and an oppositely extending, bifurcated pivot-pin receiving portion 46. The latter portion receives and carries, between the bifurcations thereof, a pivot-pin 48 which in turn carries an anti-friction bearing 50 and an end portion 52 of the other member of the pivotal coupling. A grease fitting 54 may be provided for the anti-friction bearing 50. Thus the pivot-pin 48 pivotally secures the two coupling halves of the pivotal coupling together and provides the axis of articulation thereof, as more clearly shown in Fig. 4 of the drawings.

The tab portion 44 of one coupling half is rigidly fastened to one end of the leaf spring 42, as by means of a longitudinal series of rivets 56. The other end of the leaf spring 42 is rigidly fastened to the knife by rivets 58, so that the spring is substantially longitudinally coextensive with the knife throughout the length of the spring. Thus the spring is adapted for flexure in a plane parallel to the plane of oscillation of the power transmitting member and the knife is rigidly constrained to follow a predetermined reciprocative path, and any upward or downward components of motion will be resiliently absorbed before they are transmitted to the knife.

Intermediate the ends of the leaf spring, it is offset, as at 60, to permit flexure of the spring toward and away from the cutter knife as more fully set forth hereinafter.

The pivot axis of the pivotal coupling is positioned as closely as practical to the plane of the knife, as differentiated from the customary positioning of the ball and socket joint of the conventional pitman drive.

In the preferred form of the invention the pivotal axis of the coupling will be approximately one-eighth of an inch above the horizontal center line of the knife 14, as compared to a corresponding distance of approximately two inches in the conventional pitman knife drive connections.

The second coupling half has a conical end portion 62 which is provided with axially extending internal screw threads 64 adapted to receive a cap screw 66. The conical end is adapted to be received in a complementary tapered socket 68 provided at the end of the power transmitting member 38. Thus, in the assembled position, the head of the cap screw 66 bears against the upper end of tapered socket 68 and the two members are securely fastened together for quick and easy separation by merely removing the cap screw 66 and withdrawing the conical end portion 62 from its complementary tapered socket.

In the preferred form of the invention the angle of the cone 62 and the socket 68 are such that the assembly is slightly self-locking so that a light tap on the partially removed cap screw 66 will release the joint. Thus when the cap screw 66 is tight, the joint will also be slightly self-locking which diminishes the amount of tension necessary in the cap screw 66 and lessens the wear on the coupling. It is known that when the enclosed angle in a taper coupling is less than 16° it is self-holding, while an included angle of more than 16° is considered to be self-releasing. Very satisfactory results are obtained in the present invention when the included angle of the taper is from about 14° to about 15° as indicated in Fig. 5 of the drawings. When this angle is made too small it has been found that excessive pounding is necessary, on the slightly loosened screw, to release the connection between the power transmitting member 38 and the knife blade, and when the included angle is much greater than 15° it is difficult to keep the cap screw 66 tight.

Another factor which affects the amount of tension which is necessary to be applied to the cap screw 66 in order to provide trouble-free operation is the angle at which a line 70, Fig. 3, through the axis of oscillation of the power transmitting member and the pivot axis of the pivotal coupling intersects a line 72 passing axially through the tapered socket 68. The smaller the angle between lines 70 and 72, the lesser amount of tension would need to be applied by the cap screw 66. In addition to this, as line 72 approaches the vertical, there is less likelihood of dirt or foreign matter remaining lodged in the coupling during disassembly of the knife to obstruct proper reassembly in the field. However, as to be more fully described hereinafter, if the lines 72 and 70 should coincide, the knife blade assembly could not be conveniently removed and replaced for sharpening and repairs. It has therefore been found that very satisfactory results are obtained when the angle between the line 70 and the line 72 is about 45°. Under these conditions, not only is convenient access afforded for the uncoupling and recoupling of the knife from the power transmitting member, but no precise adjustments are required at this connection to prevent lost motion.

As more clearly shown in Fig. 5, in order to remove the knife for sharpening or repair, the operator first takes the machine out of gear and rotates the drive mechanism so that the blade 16 is at the outermost location. The cap screw 66 is loosened approximately one turn and tapped on its top to loosen the cone 62. The cap screw is then removed and the drive unit is rotated so that the knife is at the innermost location. Placing his foot on the knife to prevent its reciprocation the operator then rotates the drive so that the arm 38 swings to its outermost location remote from the cutter knife leaving the knife head free and capable of being withdrawn from the cutter bar. When the blade is to be reinserted the knife can simply be shoved into place and the small end of the cone 62 readily engages the large diameter of the socket and swings upward as it seats therein so that the operator need merely replace and tighten the cap screw.

Thus it will be seen that while a very satisfactory angular separation between lines 70 and 72 is 45°, a smaller angular displacement may be used so long as the aforementioned assembly can be accomplished. In keeping with the space limitations the tip A, shown in broken lines in Fig. 5, of the conical member 62 must clear the edge B of the tapered socket as the knife assembly is slipped into place.

In operation of the improved drive connection oscillation of the shaft 28 will cause the lower end of the power transmitting member to travel along an arc centered in the shaft 28. As the power transmitting member oscillates, the pivotal coupling will cause the resilient leaf spring 42 to flex slightly away from and toward the mower knife 14, and will also impart smooth reciprocatory motion to the mower knife. In order to greatly reduce wear between the knife blade assembly and the wear plates 25 resulting from the forward movement of the cutter bar and the backward pressure of the knife against the wear plates, it is advantageous to adjust the position of the knife blade so that a portion of this thrust is absorbed by the spring 42. This adjustment is readily made by loosening the tangent screw 37 and then sliding the clamp 29 and the power transmitting arm 38 forwardly on the splined end of shaft 28, see particularly Fig. 2, so that the leaf spring 42 will bear forward on the knife releasing substantially the pressure on the wear plate 25. When the correct tension is obtained the tangent screw 37 is then tightened.

It will be evident to those skilled in the art that while the leaf spring 42, which is riveted rigidly to the knife blade and to the tab 44 of the pivotal connection, will, when properly positioned as above described, release considerable pressure on the wear plates, it is not intended that the wear plates should be eliminated from the cutter assembly.

From the foregoing description it will be seen that the aims, objects, and advantages of the invention are fully accomplished.

It will be evident that various modifications may be made in the construction, form, and use of the drive connection. For example, the pivotal coupling 40 could be replaced by a ball and socket or other type of universal joint without sacrificing many of the advantages of the leaf spring components of the invention.

I claim:

1. In a mowing machine having a sickle bar assembly including an elongated reciprocating knife and an oscillatory power transmitting member, means including a leaf spring connecting the oscillatory power transmitting member to the knife, said means pivotally connecting the leaf spring and the power transmitting member comprising a first coupling half having a conical end, axial internal screw threads in the conical end of said first coupling half adapted to receive a cap screw for releasably securing the conical end of said first coupling half in a complementary conical socket in one end of the power transmitting member, a second coupling half pivotally connected to the other end of the first coupling half, the axis of the pivotal connection being disposed transversely to the plane of oscillation of the power transmitting member, and means connecting the other end of said second coupling half to said leaf spring.

2. A reciprocatory motion imparting device comprising a power transmitting member having a conical socket, means for imparting oscillatory motion thereto, means connecting said member to a device to be reciprocated, comprising a leaf spring adapted for flexure in a plane parallel to the plane of oscillation of the power transmitting member having one of its ends secured to a device to be reciprocated, a first coupling half having a conical end adapted to be received in the complementary conical socket in said power transmitting member, a second coupling half pivotally connected to the other end of the first coupling half, the axis of the pivotal connection disposed transversely to the plane of oscillation of the power transmitting member, and means connecting the other end of said second coupling half to said leaf spring substantially within the plane of the device to be reciprocated.

3. A reciprocatory motion imparting device as defined in claim 2 wherein the longitudinal axis of the conical socket is disposed at about a 45° angle to a line through the axis of oscillation of the power transmitting member and the pivotal axis of said coupling halves.

References Cited in the file of this patent

UNITED STATES PATENTS

| | | |
|---|---|---|
| 2,097,921 | Hite | Nov. 2, 1937 |
| 2,324,563 | Custenborder | July 20, 1943 |
| 2,616,234 | Love | Nov. 4, 1952 |